United States Patent
Yanagida et al.

(10) Patent No.: US 7,352,282 B2
(45) Date of Patent: Apr. 1, 2008

(54) COMMUNICATION SYSTEM

(75) Inventors: Yo Yanagida, Susono (JP); Naoyuki Shiraishi, Susono (JP); Atsushi Kawamura, Susono (JP); Terumitsu Sugimoto, Susono (JP)

(73) Assignee: Yazaki Corporation, Tokyo (JP)

( * ) Notice: Subject to any disclaimer, the term of this patent is extended or adjusted under 35 U.S.C. 154(b) by 275 days.

(21) Appl. No.: 11/178,310

(22) Filed: Jul. 12, 2005

(65) Prior Publication Data
US 2007/0013490 A1 Jan. 18, 2007

(51) Int. Cl.
G08B 1/08 (2006.01)
H04M 11/04 (2006.01)
H04Q 1/30 (2006.01)

(52) U.S. Cl. .............. 340/538; 340/310.11; 340/999; 340/825.57; 333/81 R; 307/9.1

(58) Field of Classification Search ............ 340/538
See application file for complete search history.

(56) References Cited

U.S. PATENT DOCUMENTS

| 3,673,313 | A | * | 6/1972 | Pickett et al. ............ 174/90 |
| 4,787,040 | A | * | 11/1988 | Ames et al. ............. 707/1 |
| 5,745,027 | A | * | 4/1998 | Malville ............. 340/428 |
| 5,821,637 | A | * | 10/1998 | Shimada et al. ......... 307/91 |
| 5,859,584 | A | * | 1/1999 | Counsell et al. ......... 340/538 |
| 5,873,738 | A | * | 2/1999 | Shimada et al. ......... 439/61 |
| 6,229,434 | B1 | * | 5/2001 | Knapp et al. ......... 340/310.16 |
| 6,549,120 | B1 | * | 4/2003 | de Buda ............. 370/482 |
| 6,667,685 | B2 | * | 12/2003 | Wasaki et al. ........ 340/310.13 |
| 6,800,957 | B2 | * | 10/2004 | Nerone et al. .......... 307/9.1 |
| 6,842,108 | B2 | * | 1/2005 | Akiyama et al. ...... 340/310.11 |
| 7,082,357 | B2 | * | 7/2006 | Fujita et al. ............ 701/29 |
| 2003/0076221 | A1 | * | 4/2003 | Akiyama et al. ...... 340/310.01 |
| 2004/0189090 | A1 | * | 9/2004 | Yanagida et al. ......... 307/10.1 |
| 2004/0207262 | A1 | * | 10/2004 | Yanagida et al. ...... 340/310.01 |
| 2004/0207263 | A1 | * | 10/2004 | Yanagida et al. ......... 307/10.1 |
| 2004/0223275 | A1 | * | 11/2004 | Yanagida et al. ............ 361/62 |

FOREIGN PATENT DOCUMENTS

| DE | 103 40 431 A1 | 4/2004 |
| DE | 102 60 747 A1 | 7/2004 |
| JP | 2003-118509 A | 4/2003 |
| JP | 2004-56197 A | 2/2004 |

\* cited by examiner

Primary Examiner—Benjamin C. Lee
Assistant Examiner—Eric M. Blount
(74) Attorney, Agent, or Firm—Sughrue Mion, PLLC

(57) ABSTRACT

A communication system includes a power line, a plurality of PLC networks connected to the power line in common, and an electronic control unit for controlling an electric equipment, connected to the power line between the PLC networks. The electronic control unit includes a bypass capacitor that attenuates a communication signal transmitting over the power line.

7 Claims, 6 Drawing Sheets

COMMUNICATION SYSTEM

BACKGROUND OF THE INVENTION

The present invention relates to a vehicle information communication technology including a vehicle-mounted equipment control technology using PLC (Power Line Communication) for transmitting a control signal as well as power by using a power line for feeding power to a load.

Power line communication (hereinafter referred to as PLC) is used as a communication method for controlling various types of electrical equipment mounted on an automobile such as a power window and a wiper.

FIG. 5 is a conceptual illustration showing a configuration of a vehicle-mounted equipment control system using PLC as an example of a vehicle information communication system. The system shown in FIG. 5 supplies power from a battery (not shown) to a plurality of loads 73 comprising electrical equipment, and a master controller 74 (hereinafter referred to simply as a master) and a slave controller 75 (hereinafter referred to simply as a slave) for controlling these loads via a junction connector (J/C) 72 connected to a power line 71. The slave 75 is a controller provided for each load 73 while the master 74 is a controller for controlling the loads 73 via the slaves 75. In this system, the master 74 transmits a communication signal SigM to the slave 75 as a distant party via a power line (a power line in the PLC network is hereinafter referred to as a sub power line) 77 in a PLC network 76 interconnected by the junction connector 72. The slave 75 receives the communication signal SigM via the sub power line 77 and transmits, via the sub power line 77, a communication signal SigS indicating the state of the load 73 controlled by the slave 75. The master 74 transmits a communication signal SigM corresponding to the communication signal SigS received from the slave 75. The master 74 and each slave 75 control the respective loads 72 while communicating with each other via the sub power line 76 (refer to JP-A-2003-118509).

A vehicle-mounted equipment control system using PLC is capable of performing proper control operation in case the PLC network exists alone as shown in FIG. 5, because communication between the master and the slaves are kept stable. FIG. 6 shows the case of two PLC networks 80 and 90 which are adjacent to each other via the main power line 71. As shown in FIG. 6, interference between the PLC networks 80 and 90 may cause improper control operation. In the example of FIG. 6, a communication signal SigA communicated between the master 83 and the slave 84 in the PLC network 80 invades, via the main power line 71, the PLC network 90 that is adjacent to the PLC network 80, thus interfering with the communication in the PLC network 90. Conversely, a communication signal SigB in the PLC network 90 invades the PLC network 80 via the main power line 71, thus interfering with the communication in the PLC network 80.

SUMMARY OF THE INVENTION

The invention has been accomplished in view of the aforementioned circumstances and has as an object to provide a communication system enable to prevent interference between PLC networks even in case the PLC networks are in such close proximity to each other as to cause serious interference.

In order to attain the object, the invention provides a communication system, comprising:
 a power line;
 a plurality of PLC networks connected to the power line in common; and
 an electronic control unit for controlling an electric equipment, the electronic control unit being connected to the power line between the PLC networks,
 wherein the electronic control unit includes a bypass capacitor that attenuates a communication signal transmitting over the power line.

According to the communication system, a communication signal transmitting over a power line connecting PLC networks is attenuated by way of a bypass capacitor in an electronic control unit even in case the PLC networks are in such close proximity to each other as to cause serious interference. This prevents interference between PLC networks. A bypass capacitor in the electronic control unit for controlling electric equipment mounted on a vehicle is used as a capacitor for attenuating a communication signal from an adjacent PLC network. This eliminates the need for additionally providing a capacitor for attenuating a signal.

In order to attain the object, the invention provides a communication system, comprising
 a power line;
 a plurality of PLC networks connected to the power line in common; and
 a junction connector provided on the power line between the PLC networks,
 wherein the junction connector includes a capacitor that attenuates a communication signal transmitting over the power line.

According to the vehicle information communication system, the communication signal transmitting over the power line is attenuated by way of a bypass capacitor in the junction connector even in case the PLC networks are in such close proximity to each other as to cause serious interference of communication signals. This prevents interference between PLC networks. In this way, in case a bypass capacitor is provided in a junction connector to relay power lines as a capacitor for attenuating a communication signal coming from an adjacent PLC network, it is unnecessary to additionally provide a capacitor for attenuating a signal.

The vehicle information communication system according to the invention is capable of preventing interference between PLC networks even in case the PLC networks are in such close proximity to each other as to cause serious interference of communication signals. This allows accurate control of vehicle-mounted equipment free from malfunction caused by interference between PLC networks. Moreover, it is unnecessary to additionally provide a capacitor for attenuating a signal. This eliminates the need for reserving a space for mounting a capacitor, which provides a cost-effective vehicle information communication system.

The invention has been briefly described. Details of the invention will be further clarified by reading the following description of the best embodiments for implementing the invention while referring to the attached drawings.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Best embodiments for implementing the invention will be described below.

Figure 1:
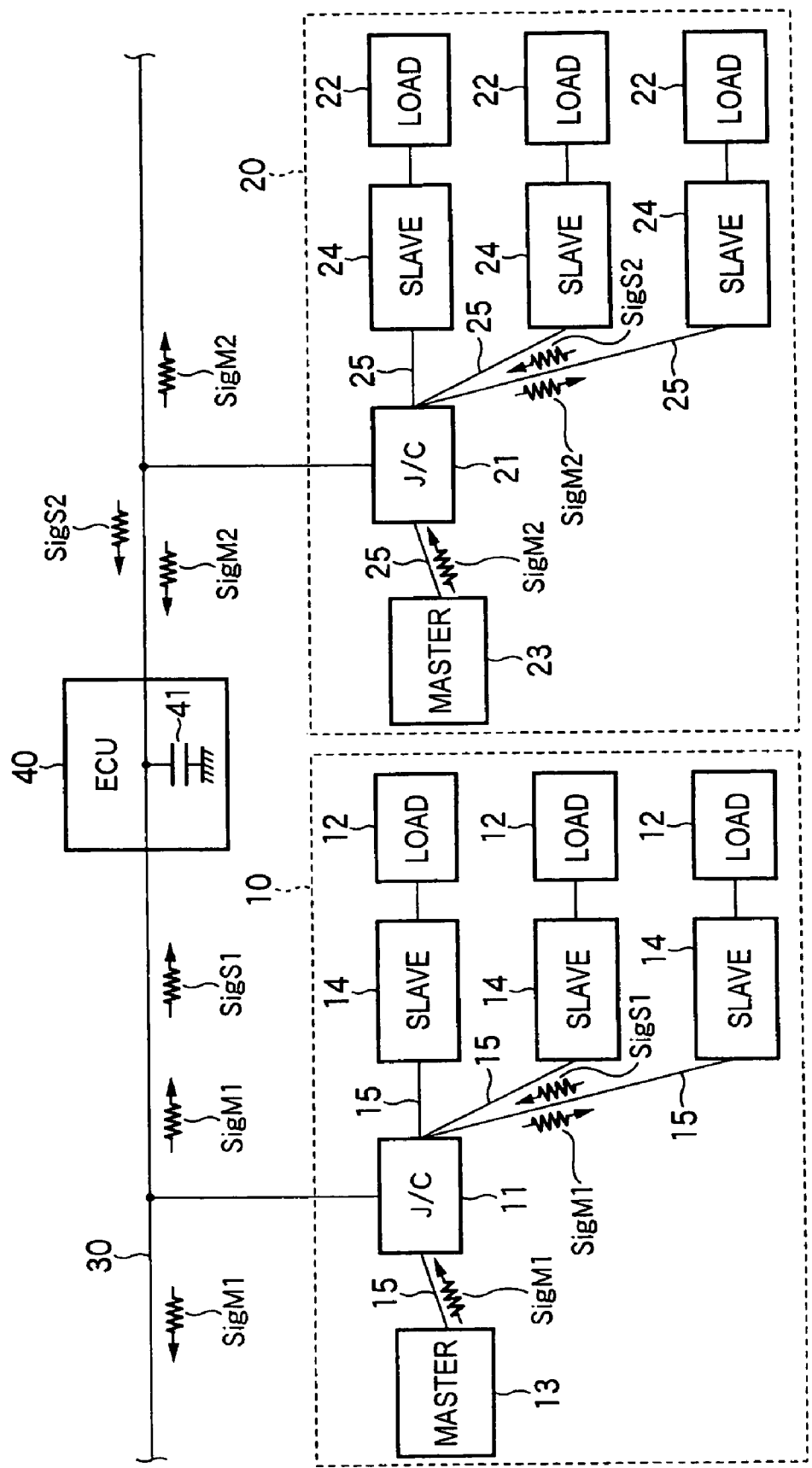
FIG. 1 is a conceptual illustration showing a vehicle-mounted equipment control system as an example of a vehicle information communication system according to a first embodiment of the invention.

FIG. 1 is a conceptual illustration showing a vehicle-mounted equipment control system as an example of a vehicle information communication system according to a first embodiment of the invention. In FIG. 1, numerals 10, 20 represent PLC networks. These networks are in such close proximity to each other as to cause serious interference. The PLC networks 10, 20 are respectively connected to a main power line 30 for transmitting power from a battery (not shown).

In a first PLC network 10, power from the main power line 30 is supplied to a plurality of loads 12 including electrical equipment, and a master 13 and a slave 14 for controlling these loads via a sub power line 15 and a junction connector 11. In a second PLC network 20, power from the main power line 30 is supplied to a plurality of loads 22 including electrical equipment other than the electrical equipment in the first PLC network 10, and a master 23 and a slave 24 for controlling these loads via a sub power line 35 and a junction connector 21. The slaves 14, 24 are controllers provided for loads 12 and 22 respectively while the masters 13, 23 are controllers for controlling the loads 12, 22 respectively via the slaves 14, 24.

The master 13 in the first PLC network 10 transmits a communication signal SigM1 to the slave 14 as a distant party via the sub power line 15 and the junction connector 11 in the first PLC network 10. The slave 14, receiving the communication signal SigM1 from the master 13, transmits a communication signal SigS1 indicating the state of the load 12 controlled by the slave 14 to the master 13 via the sub power line 15 and the junction connector 11 in the PLC network 10. The master 13 transmits the communication signal SigM1 corresponding to the communication signal SigS1 received from the slave 14. In this way, the master 13 and each slave 14 control the respective loads 12 while communicating with each other via the sub power line 15 and the junction connector 11 in the first PLC network 10.

The master 23 in the second PLC network 20 transmits a communication signal SigM2 to the slave 24 as a distant party via the sub power line 25 and the junction connector 21 in the second PLC network 20. The slave 24, receiving the communication signal SigM2 from the master 23, transmits a communication signal SigS2 indicating the state of the load 22 controlled by the slave 24 to the master 23 via the sub power line 25 and the junction connector 21 in the second PLC network 20. The master 23 transmits the communication signal SigM2 corresponding to the communication signal SigS2 received from the slave 24. In this way, the master 23 and each slave 24 control the respective loads 22 while communicating with each other via the sub power line 25 and the junction connector 21 in the second PLC network 20.

Figure 6:
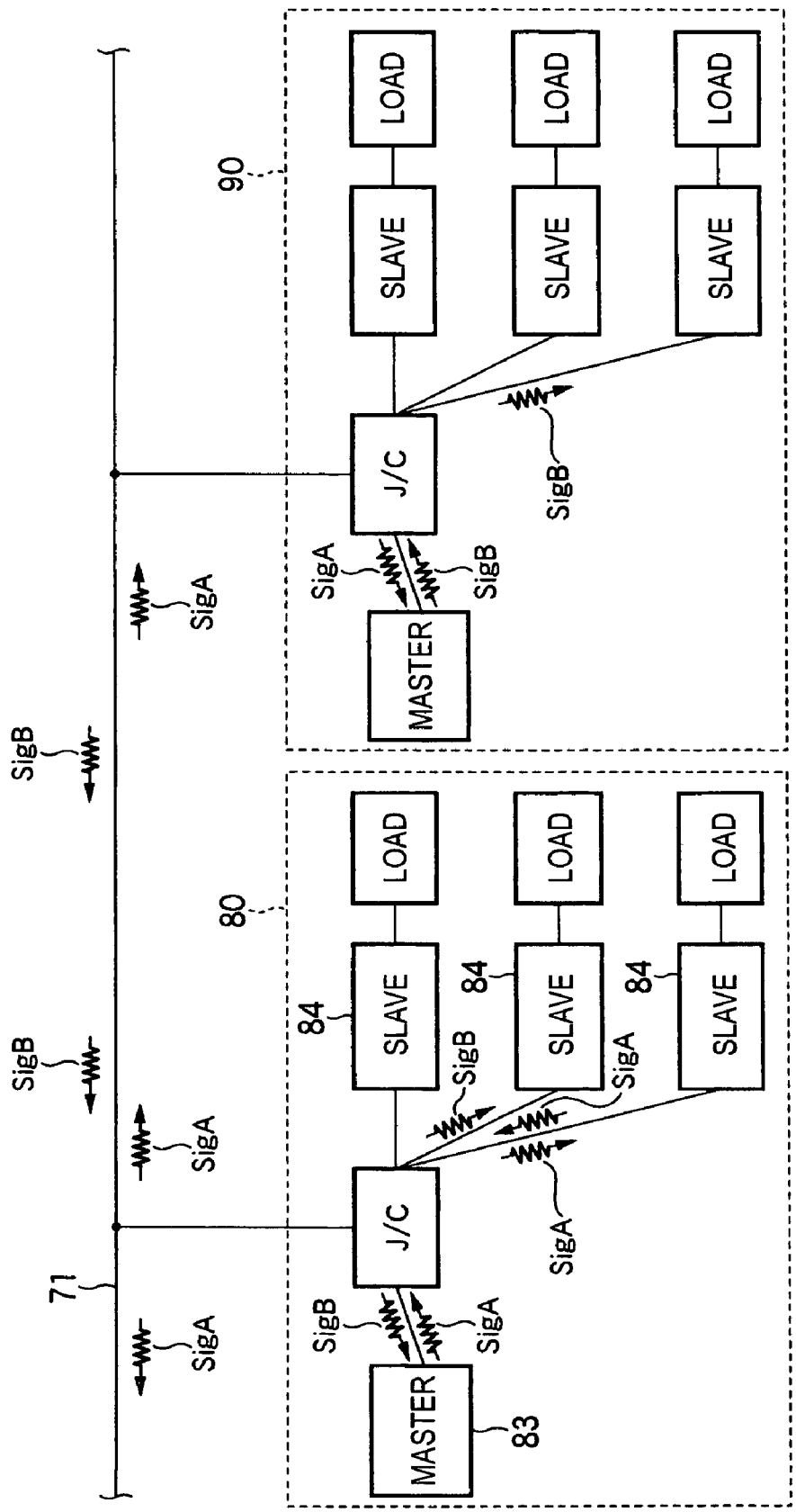
FIG. 6 is a conceptual illustration of a vehicle-mounted equipment control system where interference between adjacent PLC networks is problematic.

The above operation is the same as that in the related art system shown in FIG. 6. Thus, control operation may become improper due to interference between the PLC networks 10 and 20.

To be more precise, the communication signals SigM1 and SigS1 communicated between the master 13 and the slave 14 in the first PLC network 10 invades, via the main power line 30, the second PLC network adjacent to the first PLC network 10, thus interfering with the communication in the second PLC network 20. Conversely, communication signals SigM2, SigS2 in the second PLC network 20 invade the first PLC network 10 via the main power line 30, thus interfering with the communication in the PLC network 10.

To solve this problem, in the first embodiment shown in FIG. 1, an electronic control unit (ECU) 40 is interposed into the main power line 30 connecting the PLC networks 10 and 20 in order to attenuate a communication signal transmitting over the main power line 30 by way of a bypass capacitor 41 in the power control unit 40.

According to the vehicle information communication system, the communication signal transmitting over the power line 30 connecting the PLC networks 10 and 20 is attenuated by way of the bypass capacitor 41 in the electronic control unit 40. The bypass capacitor 41 prevents interference between the PLC networks 10, 20. Moreover, the bypass capacitor 41 in the electronic control unit 40 that controls electrical equipment mounted on a vehicle is used as a capacitor for attenuating a communication signal. It is thus unnecessary to additionally provide a capacitor for attenuating a signal.

Figure 2:
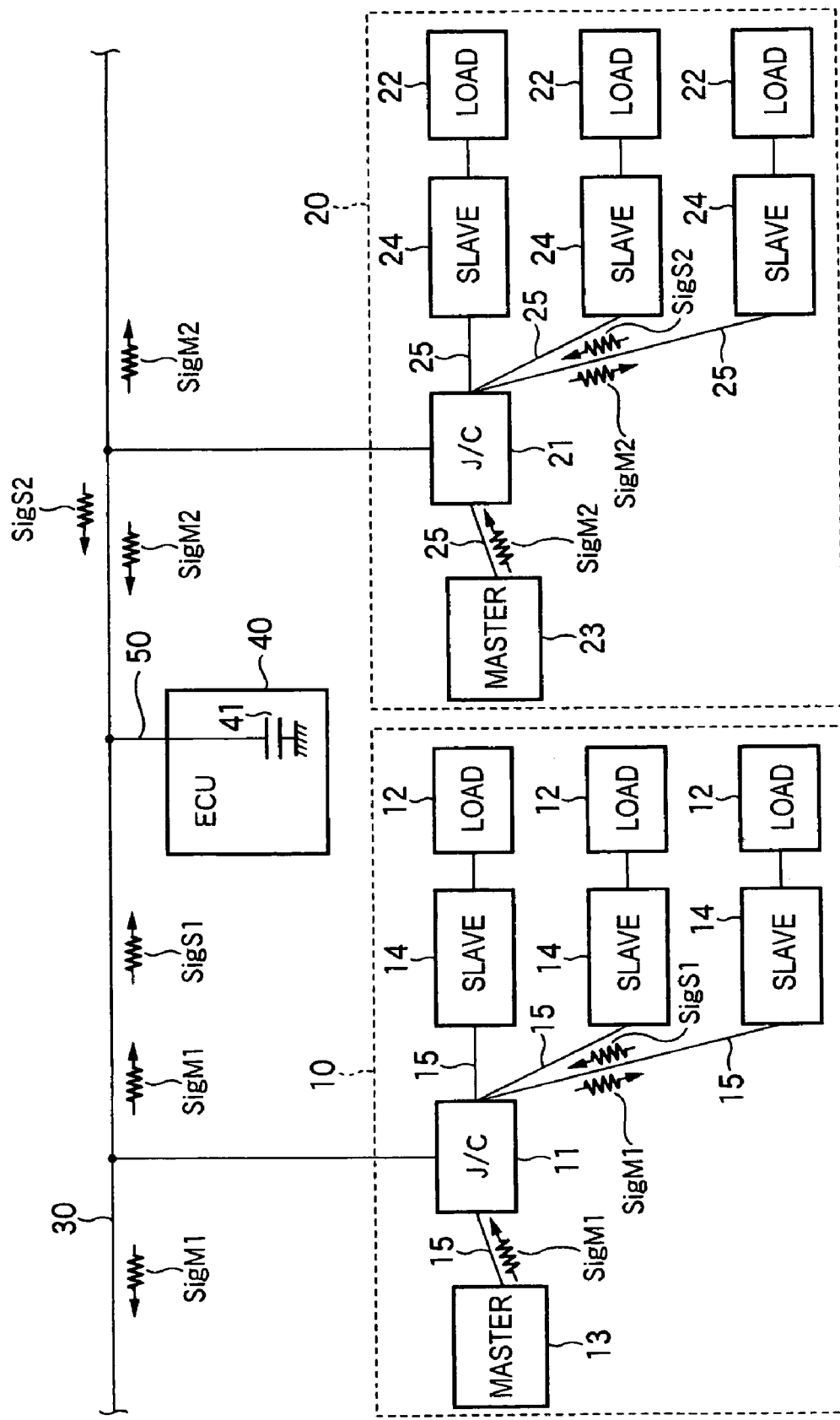
FIG. 2 is a conceptual illustration showing the vehicle-mounted equipment control system according to a second embodiment of the invention.
Figure 3:
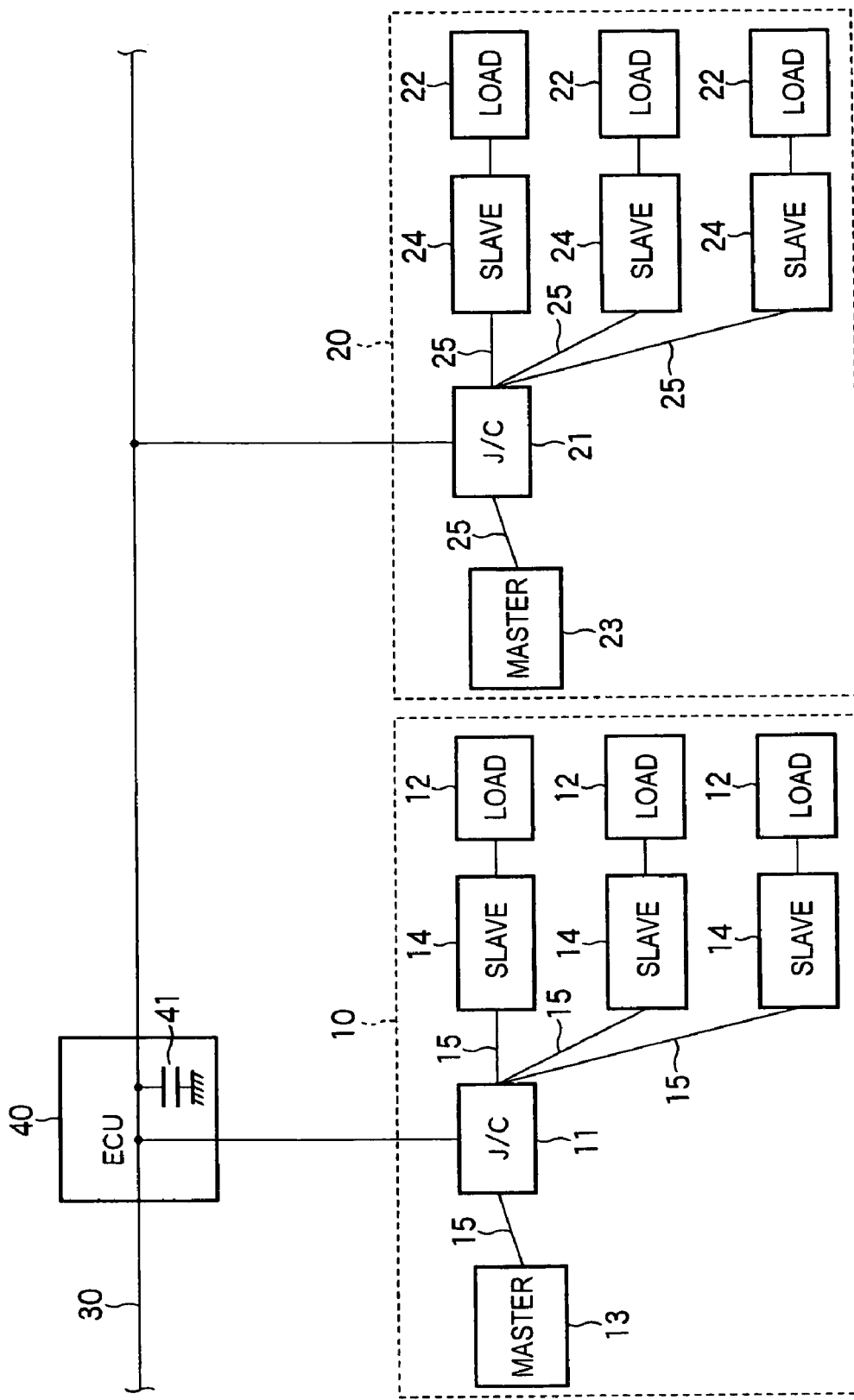
FIG. 3 is a conceptual illustration showing the vehicle-mounted equipment control system according to a third embodiment of the invention.

While the electronic control unit 40 is provided on the main power line 30 connecting the PLC networks 10 and 20 in the first embodiment, the connection form of the electronic control unit 40 is not limited thereto. For example, the electronic control unit 40 may be connected to the main power line 30 via a wire harness 50, as shown in FIG. 2. Alternatively, the electronic control unit 40 may be provided at the junction between the main power line 30 and one of the PLC networks (the PLC network 10 in this example), as shown in FIG. 3.

Figure 4:
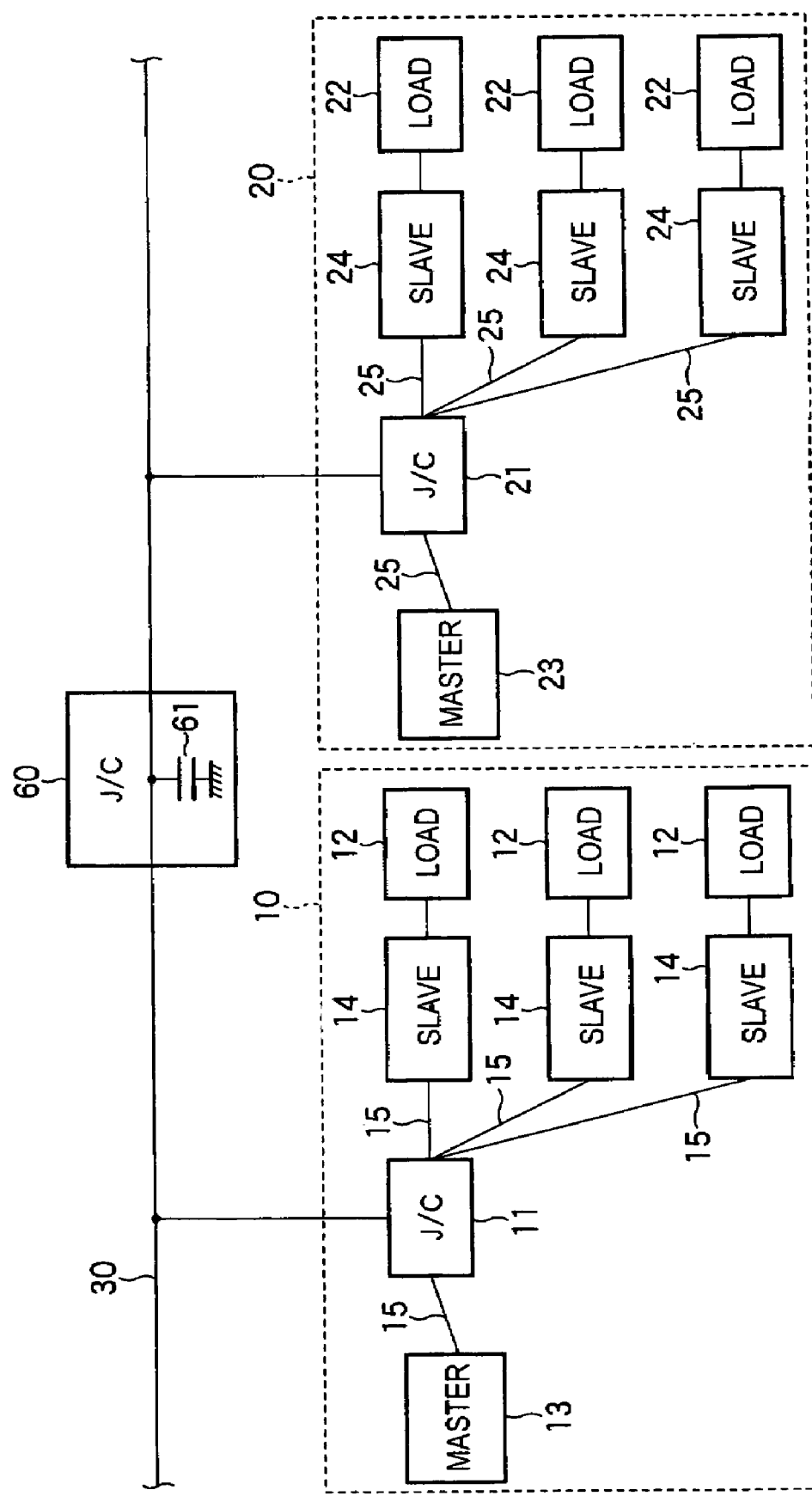
FIG. 4 is a conceptual illustration showing the vehicle-mounted equipment control system according to a fourth embodiment the invention.
Figure 5:
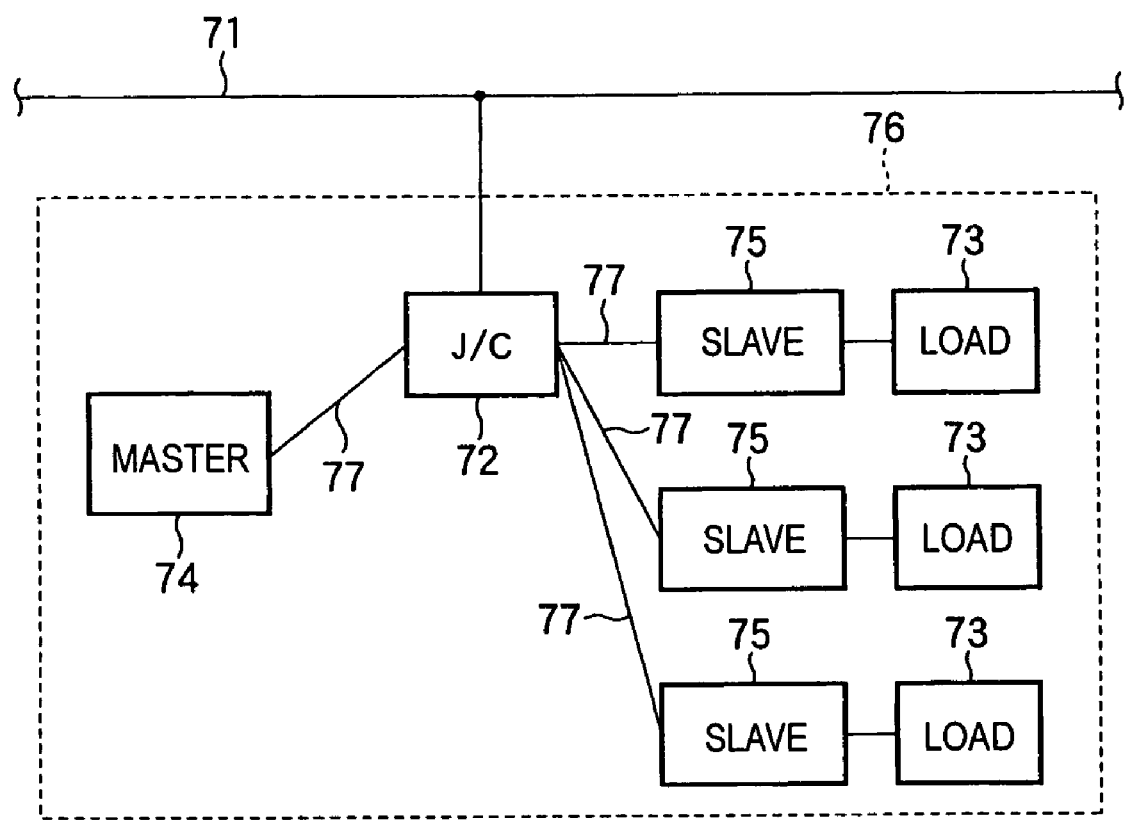
FIG. 5 is a conceptual illustration of a vehicle-mounted equipment control system having a single PLC network.

Referring now to FIG. 4, as an alternative to the electronic control unit 40, a junction connector 60 including a capacitor 61 for signal attenuation may be provided on the main power line 30 connecting the PLC networks 10 and 20 in order to attenuate a communication signal transmitting over the main power line 30 by way of the capacitor 61 in the junction connector 60.

The invention is not limited to the aforementioned embodiments but various changes or improvements of the invention are possible as required. The form, quantity, and location of each component in the foregoing embodiments are arbitrary and are not limited as long as the purpose of the invention is attained.

What is claimed is:
1. A communication system, comprising:
    a power line;
    a plurality of power line communication (PLC) networks connected to the power line in common; and
    an electronic control unit for controlling an electric equipment, the electronic control unit being connected to the power line between the PLC networks, wherein the electronic control unit includes a bypass capacitor that attenuates a communication signal transmitting over the power line.

2. A communication system, comprising
a power line;
a plurality of power line communication (PLC) networks connected to the power line in common; and
a junction connector provided on the power line between the PLC networks,
wherein the junction connector includes a capacitor that attenuates a communication signal transmitting over the power line.

3. The communication system of claim 1 wherein the electronic control unit is connected directly to the main power line.

4. The communication system of claim 1, wherein the electronic control unit is connected to the power line via a wire harness.

5. The communication system of claim 1, wherein the electronic control unit is connected at a junction between the power line and one of the plurality of PLC networks.

6. The communication system of claim 2, wherein the junction connector is located at a junction between the power line and one of the plurality of PLC networks.

7. A communication system, comprising:
a power line;
a first power line communication (PLC) network comprising at least two devices that employ power line communication;
a second PLC network comprising at least two devices that employ power line communication; and
an electronic control unit connected to the power line,
wherein the first PLC network and the second PLC network are connected to the power line,
wherein the electronic control unit is disposed between the first PLC network and the second PLC network, and
wherein the electronic control unit comprises a bypass capacitor that attenuates a communication signal that is transmitted over the power line.

* * * * *